July 7, 1970 W. S. LOCKS 3,519,825
SYSTEM FOR DETECTING THE PRESENCE OF AN INFRARED-RADIATING
ARTICLE WHICH DISCRIMINATES BETWEEN RADIATION EMANATING
FROM THE ARTICLE AND BACKGROUND RADIATION
Filed Feb. 7, 1967 3 Sheets-Sheet 1

INVENTOR.
William S. Locks
BY
ATTORNEY

FIG.4

3,519,825
SYSTEM FOR DETECTING THE PRESENCE OF AN INFRARED-RADIATING ARTICLE WHICH DISCRIMINATES BETWEEN RADIATION EMANATING FROM THE ARTICLE AND BACKGROUND RADIATION

William S. Locks, Dickson City, Pa., assignor to Weston Instruments, Inc., Newark, N.J., a corporation of Delaware
Filed Feb. 7, 1967, Ser. No. 614,513
Int. Cl. G01n 21/34
U.S. Cl. 250—83.3                                7 Claims

ABSTRACT OF THE DISCLOSURE

A system for detecting the presence of an infrared-radiating article such as a metallic strip, bar or the like, includes a source of constant-amplitude pulses which are applied to an active infrared detector; there being relative movement between the article and the detector. When the detector senses the initial presence of the article, the resistance of the detector decreases proportionately causing an increase in the height of one or more constant-amplitude pulses which are coincidentally applied to the detector. A pulse height discriminator is set to pass only those pulses having a predetermined minimum height; this height being greater than the pulse height that is produced principally by background radiation incident to the detector. The pulses which pass the pulse discriminator are received by a monostable device which is normally in a reset state but which is switched into a set state in response to the first composite pulse of the pulse train which passes the discriminator. The monostable device may be adjusted so that a missing pulse or pulses from the pulse train which may result from attenuation of the radiation applied to the active infrared detector by extraneous surface matter on the strip does not cause the monostable device to reset. The monostable device resets after the rearward end of the detected strip advances beyond the field of detection of the active infrared detector. The respective set and reset states of the monostable device may be continuously recorded by a digital computer to which printout access may be made at any time.

If desired, two or more infrared detection systems, of the type described above, may time-share a centrally located digital computer so that two or more detection systems and stations may be monitored by the computer.

---

This invention relates to systems for detecting infrared radiation from a radiating article and, more particularly, to a system for detecting an infrared-radiating strip, sheet, rod or the like, as it approaches and/or travels past an infrared detector.

There is an increasing trend to continuously monitor the flow or movement of articles through one or more work stations in a plant by a central digital computer to which time-shared access may be had. The information supplied the computer as input information is obtainable from one or more detection systems located at one or more stations throughout the plant. Physical contact between the detection system and the articles is not desirable in those instances where the articles are at a high enough temperature to cause pitting, corrosion and other temperature-caused deleterious effects on an element of the system which makes such contact. This is the situation when, for example, strips of steel are rolled at temperatures of between 1200° F. and 2200° F. in a hot rolling mill to a predetermined thickness or shape. Under these circumstances resort may be made to detection systems, such as infrared detection systems, which do not physically contact the advancing strip and yet sense the infrared radiation emanating from the strip.

As will be appreciated by those working in the infrared instrumentation art, an infrared detection system utilizing an infrared detector senses and responds only to infrared energy incident to the infrared-sensitive objective of the detector, that is, to infrared energy present within the field of detection of the detector. In general, the amount of infrared energy incident to the objective detector is a function of the amount of radiant emittance of the article at a given wavelength; the amount of background radiation; and the amount of radiant energy attenuation between the radiating article and the detector objective.

Considering each of these factors, the radiant emittance at a given wavelength is primarily dependent upon the distance of the radiating article from the objective of the detector, the radiant intensity spectrum of the article and the angle formed between the article and the objective. The amount of background radiation depends upon such factors as the temperature and size of the background radiating medium and the distance of the detector objective from that medium. The amount of attenuation is primarily dependent upon the medium which is interposed between the radiating article and the detector objective.

In hot strip rolling mills and in other plants where it might be desired to use infrared detection systems, it is extremely difficult to control any one of these factors and virtually impossible to control all three. For example, if a number of infrared detection systems are to be placed at prescribed locations or work stations throughout a hot steel rolling mill, the radiant emittance of a hot strip of steel will normally decrease as the strip advances from one station to another and, hence, from one detection system to another. Similarly, the background radiation which may be derived from the metal rollers which support the strip in its progress through the mill will increase as succeeding strips conduct heat to these rollers. Obviously, the rollers at one location in the mill may be at a different average temperature and may produce a different level of background radiation than the rollers at another location in the mill.

Moreover, it is not unusual for the surface of hot steel strips to include small spots of discrete areas of slag and since water is often used to cool the strip, small puddles of water may lie on the upper surface of the strip. Such spots of slag or puddles of water attenuate the intensity of the infrared radiation which is emanating from the strip and reduce the intensity of infrared radiation received at the objective of the detector to a level which may be only slightly higher than the level of the background radiation. Commercially available infrared detection systems are generally incapable of resolving such slight differences in infrared radiation levels.

An additional factor of importance which enters into the problem of providing accurate infrared detection of radiating strips of metal is that the detection system itself is subject to the ambient temperature of its environment. It is normal for moving steel strips in a steel rolling mill to be at temperatures of between 1200° F. and 2200° F. This high ambient temperature is transmitted to the detection system and produces deleterious temperature effects in all electrical and mechanical components which are subject to such effects. For instance, rotating discs mounted adjacent the objectives of infrared detectors to mechanically chop the infrared radiation before it is received by the objective of the detector to provide a pulse input flux signal typically have a high incidence of malfunctioning because of the high ambient temperatures. And, of course, any electronic system which utilizes electrical components, such as transistors, is highly susceptible to drift and failure under high ambient temperature conditions.

For these reasons, known infrared detection systems have not been able to provide accurate information as to the presence of a moving radiating article such as a strip of hot metal moving in a relatively high temperature environment, which may include discrete radiation-attenuating surface areas.

It is an object of this invention to provide an infrared detection system for detecting the presence of an infrared-radiating article, the system compensating for background radiation and for a predetermined amount of attenuation of incident infrared radiation caused by discrete radiation-attenuating surface areas.

According to this invention, an infrared detection system is provided for detecting the initial and continued presence of a moving, radiating metallic strip, bar or the like. The system includes an active infrared detector positioned to receive infrared radiation from the strip, the resistance of the detector decreasing in direct proportion to the intensity level of incident radiation. The system produces a train of square-wave voltage pulses of which individual pulses have superimposed thereon a voltage which is proportional to the decrease in resistance of the active infrared detector. Thus, the pulse height of such composite amplitude pulses increase with increases in the level of incident radiation. A pulse height discriminator is set to pass only those composite amplitude pulses having a predetermined minimum height, this height being greater than the composite pulse height which would be produced principally by background radiation. The pulses which pass the pulse discriminator are received by a monostable device which is normally in a reset state but which is switched into a set state in response to the first composite pulse of the pulse train which passes the discriminator. The monostable device may be adjusted so that a missing pulse or pulses from the pulse train which may result from attenuation of the radiation applied to the active infrared detector by extraneous surface matter on the strip does not cause the monostable device to reset. The monostable device resets after the rearward end of the detected strip advances beyond the field of detection of the active infrared detector. The respective set and reset states of the monostable device may be continuously recorded by a digital computer to which printout access may be made at any time.

If desired, two or more infrared detection systems, of the type described above, may time-share a centrally located digital computer so that two or more detection systems and stations may be monitored by the computer.

For a better understanding of the present invention, together with other and further objects thereof, reference may be had to the following description taken in connection with the accompanying drawings, the scope of the invention being pointed out in the appended claims.

Referring to the drawings.

BRIEF DESCRIPTION OF INVENTION

Figure 1:
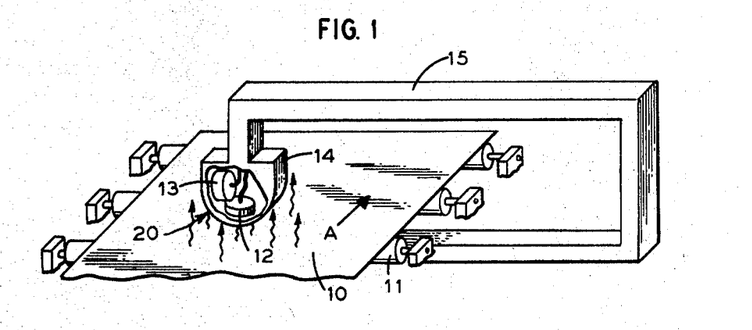
FIG. 1 is a partial perspective showing a strip of metal radiating infrared energy to an active infrared detector mounted in a supporting apparatus.

Referring to FIG. 1, numeral 10 designates a metal strip, sheet, plate or rod that is conveyed in the direction of arrow A by, for instance, a succession of metal rollers 11. The strip 10 may be at an elevated temperature of between 1200° F. and 2200° F. and the infrared energy emanating from the strip 10 is detected by a conventional infrared detector 12. The detector 12 is selected so as to be suitably matched to the particular ambient temperature range of interest. For steel mills and the like, this temperature range might be from 65° F. to 2400° F., and commercially available infrared detecting thermistors formed of small flakes of heat-treated mixtures of the oxides of cobalt, nickel or manganese might therefore be used.

Housed closely adjacent the active detector 12 so as to be at the same temperature of that detector is a matched detector 13 having its radiation-sensitive objective end shielded from infrared radiation. The shielding is easily accomplished by mounting the radiation-sensitive surface of the detector 13 flush against the opaque inner wall of a box-like housing 14. The passive detector 13 is series-connected to the detector 12 to compensate for temperature changes in the detector 12. The housing 14 encases the detectors 12 and 13 and is supported by the horizontal overhead arm of a C-frame 15. The frame 15 may be stationary or reciprocated in directions perpendicular to the direction of strip advancement as indicated by the arrow A at a constant velocity by, for example, conventional rack and pinion mechanism, not shown.

With the frame 15 stationary, the active detector 12 may be oriented in the housing 14 so that the radiating forward end of the strip 10 will enter the field of detection of the detector 12 when it is a predetermined distance upstream of the frame 15 to compensate for any time delay in the response of the instant detection system to the initial detection of the strip. With the frame 15 mounted for reciprocation in directions perpendicular to the direction of strip advancement, the detector 12 will detect the radiating portion of the advancing strip which initially enters its field of detection. Depending upon the initial position of the frame 15, this radiating portion may be a lengthwise edge portion of the strip. Upon subsequent movement of the frame 15, the detector 12 will move transversely across the strip until the field of detection of the detector moves beyond the opposite lengthwise edge of the strip. The frame 15 and the electronic detection system of this invention may be duplicated throughout the mill so that the presence of hot moving stock at any specified location in the mill may be detected. This information in digital form may be fed to a digital computer and the computer accessed to print out information as to those locations where there is moving stock. Obviously, such a system could be used to trace the course of a single piece of stock through the mill.

Figure 2:
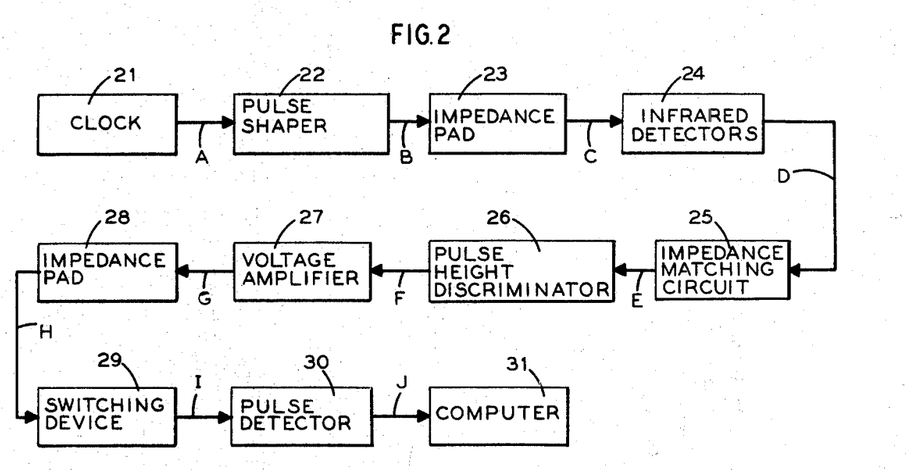
FIG. 2 is an overall block diagram of the infrared detection system of this invention.
Figure 3:
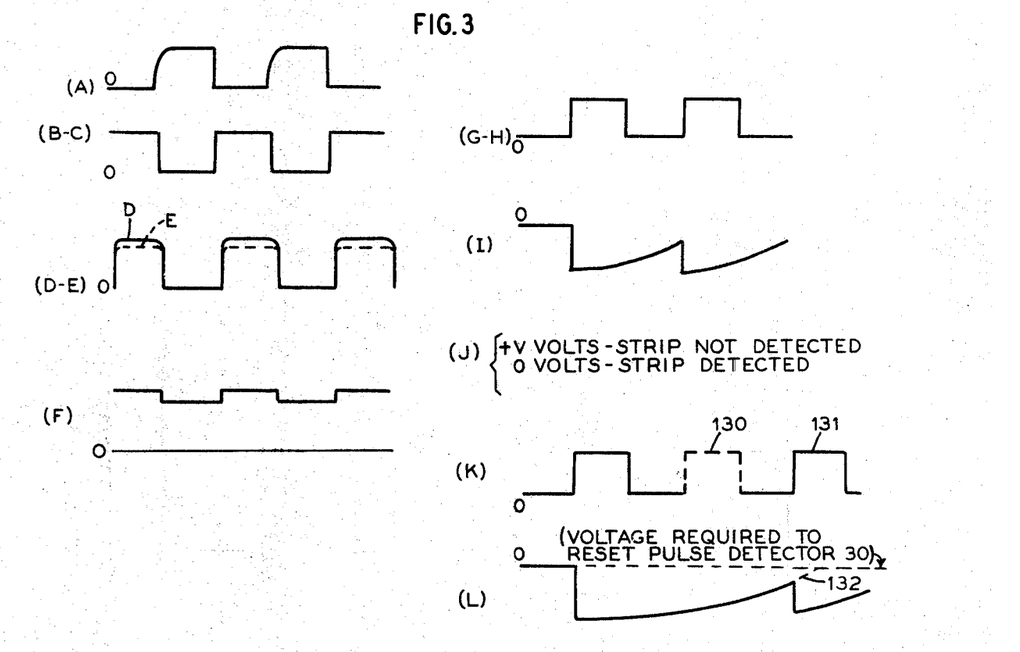
FIGS. 3A–3J, inclusive, illustrate the approximate shapes of voltage pulses which appear at the correspondingly lettered (A–J) outputs of the blocks shown in FIG. 2.
FIG. 3K depicts a group of pulses applied to a pulse detector with a missing pulse illustrated by dotted lines.
FIG. 3L illustrates the delayed response of the pulse detector to the missing pulse.

The detector 12 responds to incident radiation by providing an analog voltage signal which is added to a train of pulses having constant amplitude and frequency, FIG. 3(C). The radiation incident to the detector 12 includes background radiation (principally from the rollers 11) and radiation from the forwardly advancing strip. These constant amplitude pulses are produced by a clock 21, FIG. 2; FIG. 3(A) illustrating typical output pulses produced by the clock 21. These pulses are applied to a pulse shaper 22, FIG. 2, which squares their leading and trailing edges. An impedance pad 23, FIG. 2, which may take the form of a grounded-emitter transistor, serves to maintain the AC gain of the pulse shaper 22 and provides a low impedance output to the aforedescribed infrared detectors 12 and 13 included within the block numbered 24.

It will be appreciated that the circuitry and components embodied in all the blocks of FIG. 2, except block 24, may be located remote or isolated from the hot strips so as to be unaffected by the high temperatures generated by those strips.

With the infrared detector 12 receiving incident radiation from an advancing strip, the output from the infrared detectors 24 will include composite positive pulses having individual voltage amplitudes equal to the sum of (1) the voltage amplitude of the pulses from the clock 21, (2) the voltage across the active detector 12 due to background radiation, and (3) the voltage across the active detector 12 due to the advancing strip entering and passing through the field of detection of the detector 12. These composite positive pulses, shown by the solid line in FIG. 3(D), are applied as input pulses to an impedance matching circuit 25. The circuit 25 is utilized to provide a high impedance to the output of the infrared detectors 24 and a low impedance to a pulse height or pulse amplitude discriminator 26. In addition, the circuit 25 self-compensates for DC drift caused by temperature changes during its operation. The output voltage pulses from the circuit 25 follow substantially the input voltage pulses received from the infrared detectors 24 but have a slightly lower amplitude, as illustrated by the dotted lines referred to by the letter E in FIG. 3(E), and are applied as an input to the discriminator 26.

The discriminator 26 includes a transistor having a predetermined reverse bias applied thereto. The magnitude of this bias is set so that the transistor will not be turned on unless the amplitude of input pulses applied to the base terminal thereof is greater than that which results from the detector 12 receiving only background radiation. Thus, discrimination is provided between what may be regarded as spurious pulses produced by background radiation and nonspurious pulses produced by the strip 10 entering and passing through the field of detection of the detector 12.

Assuming that the input pulses applied to the pulse discriminator 26 are of the nonspurious type, the pulse discriminator 26 will pass these pulses, as a short train or burst of sequential pulses, FIG. 3(F). The pulse train which passes the discriminator 26 is amplified by a voltage amplifier 27, as indicated by FIG. 3(G). These amplified pulses are applied to an impedance pad 28 which serves the same function of the aforedescribed impedance pad 23 and passes received pulses without significant change in amplitude or phase, FIG. 3(H).

The output pulses from the impedance pad 28, FIG. 3(H), are applied to a switching device 29, FIG. 2, which is normally turned off but which turns on for the duration of each positive pulse received from the impedance pad 28. The switching device 29 operates to produce negative pulses, FIG. 3(I), which are essentially 180° out-of-phase with the positive pulses received from the impedance pad 28.

A pulse detector 30, FIG. 2, operating essentially as a monostable switch, is coupled to the switching device 29 and is driven from its normal "reset" state by the first pulse of the group of negative pulses produced by the switching device 29. The pulse detector 30 while in its normal reset state produces a "high" voltage output which corresponds to a "strip not detected" condition, FIG. 3(J), and upon receiving the first negative input pulse, FIG. 3(I), switches to a "set" state whereby the voltage output of the detector 30 falls rapidly to a "low" or zero voltage level. The set state of the detector 30 corresponds to a "strip detected" condition, FIG. 3(J), that is, a condition where the forward end of the hot strip 10, FIG. 1, has advanced into the field of detection of the detector 12.

A digital computer 31 may be utilized to monitor the digital voltage output of the pulse detector 30 and provide a continuous record as to whether or not a strip is advancing past the detector 12. Although the computer 31 is illustrated as having only two input terminals, obviously, the computer 31 with its normal high digital input capacity may monitor the digital output of numerous detectors located at preselected stations throughout a mill so that at any one station a printout may be obtained as to whether or not a length of radiating stock is at that station. The computer may incorporate conventional multiplexing or time-sharing input equipment to provide continuous sampling of the binary outputs of a plurality of detection system.

The pulse detector 30 compensates for pulses which might be missing from the pulse train as a result of a pool of slag or water advancing into the field of detection of the detector 12. Such pools of water or slag may cause enough attenuation of the infrared radiation to reduce the amplitude of the voltage across the detector 12 to a level such that the height of the pulse or pulses transmitted to the pulse height discriminator 26 is less than the minimum height required to pass the discriminator 26. Thus, even though a strip might be within the field of detection of the detector 12, the pulse detector 30 might reset and thereby indicate a "strip not present" condition. To overcome this problem, the pulse detector 30 is provided with a capacitor and a potentiometer coupled to the capacitor. The potentiometer may be adjusted to provide a variable RC time constant to the discharge of the capacitor and a variable time delay to the resetting of the detector 30. This time delay may be established to match the visually observed conditions of the hot strips which are advancing toward the detector 12. By increasing or decreasing the length of this time delay, a predetermined number of successive pulses may be missed from the pulse group before the pulse detector 30 resets to the "strip not detected" condition.

DETAILED DESCRIPTION OF THE INVENTION

Figure 4:
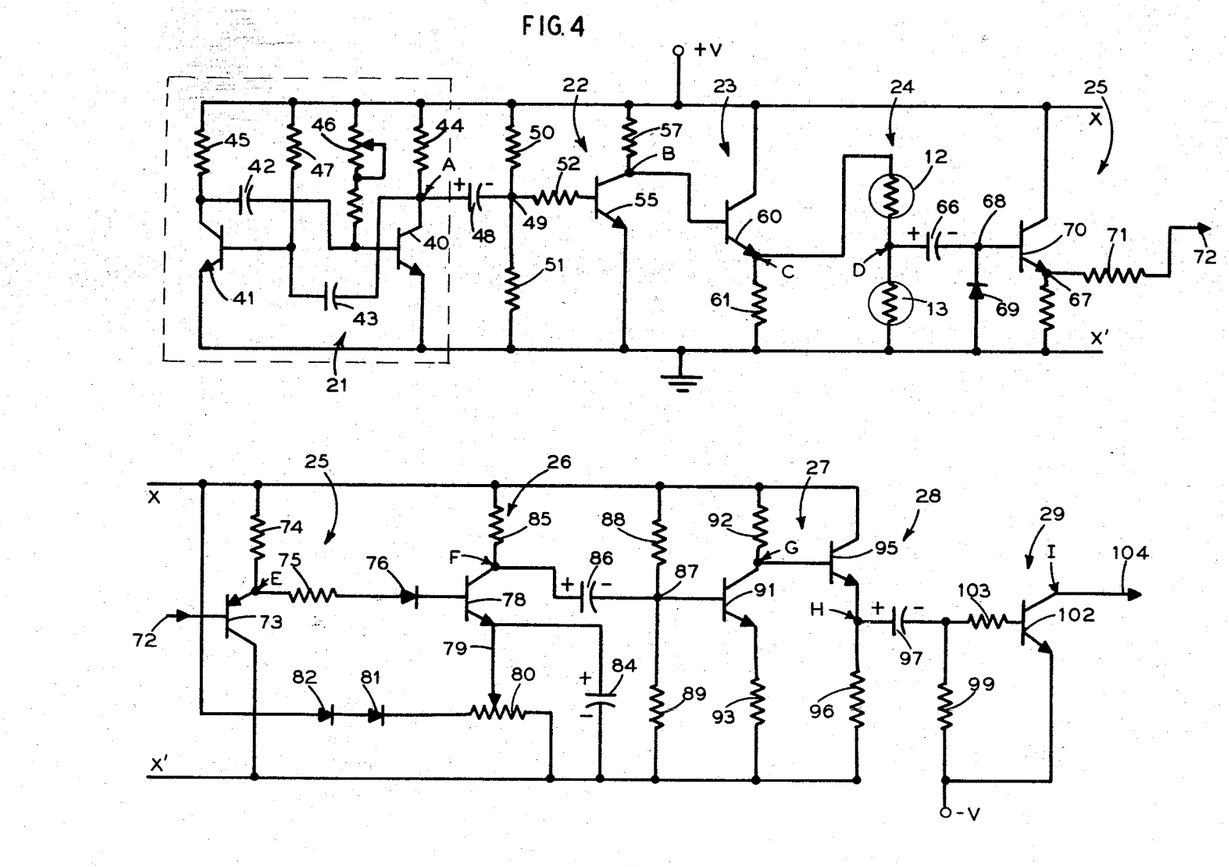
FIG. 4 is a schematic of circuits and components forming part of the infrared detection system of this invention.

Referring to FIG. 4, the clock 21 may take the form of a conventional astable or free running multivibrator which includes a pair of cross-coupled transistors 40 and 41 of the same conductivity type. The clock 21 is selected or designed so that its frequency is optimum for the time constant of the particular detector 12 employed as the active sensing element and is high enough to provide a group of serial pulses for each length or width of advancing strip. The base of the transistor 40 is coupled to the collector terminal of the transistor 41 through a capacitor 42 and, similarly, the base of the transistor 41 is coupled to the collector terminal A of the transistor 40 through a capacitor 43. A pair of collector resistors 44 and 45 having equal values of resistance are respectively connected to the collector terminals of the transistors 40 and 41 and a pair of base resistors 46 and 47 also having equal values of resistance are respectively connected to the base terminals of the transistors 40 and 41. The resistor 46 is a variable resistor that may be manually adjusted to provide a symmetrical train of square-wave output pulses from the multivibrator 21, these pulses appearing at the collector terminal A of the transistor 40. With +V volts of battery applied thereto, the multivibrator 21 will operate in the usual fashion to provide a train of square positive voltage pulses at the terminal A of the transistor 40; this train of pulses being depicted by FIG. 3(A).

The train of pulses which appear at the collector terminal A are applied to a capacitor 48 having one plate coupled to a terminal 49 which forms an input terminal for the pulse shaper 22. Resistors 50 and 51 form a voltage divider for the terminal 49. Base resistor 52 of NPN transistor 55 receives the voltage pulses which are applied to the terminal 49, the collector junction of the transistor 55 forming the output terminal of the pulse shaper 22. The resistance value of the resistor 50 is selected to be considerably greater than that of the resistor 51 so that during the interval when the voltage at the collector terminal A of the transistor 40 goes "low," the bias voltage which is applied to the base resistor 52 will drive the transistor 55 into a state of nonconduction. Conversely, when voltage on the collector terminal A of the transistor 40 goes "high," the magnitude of this voltage is high enough to forward bias the transistor 55 into saturation. Thus, the transistor 55 is operated either at saturation or nonconduction.

The operation of this portion of the circuit may be described as follows. When +V volts of battery are applied initially to the circuit, by virtue of the inherent asymmetry of the multivibrator 21, the transistor 40 will assume an opposite conductivity state to that of the transistor 41. During the portion of the operating cycle of the multivibrator 21 that the transistor 41 is turned on and the transistor 40 is turned off, the voltage at the collector terminal A of the transistor 40 will rise with a usual RC time delay to a more positive value, as illustrated by the leading edges of the pulses of FIG. 3(A). As the voltage of the terminal A rises, the capacitor 48, FIG. 4, passes this voltage to the terminal 49 causing the transistor 55 to turn on for an interval of each positive voltage pulse.

When the transistor 40 is subsequently turned on by continued operation of the multivibrator 21, the voltage on terminal A drops to ground potential. The voltage divider which is connected to the terminal 49 is initially set so that the potential which appears on the terminal 49 is lower than that required to turn on the transistor 55. Hence, the transistor 55 turns off and remains turned off for the same time interval that the transistor 40 is turned on. Accordingly, the operation of the transistor 55 follows that of transistor 41 and is opposite to that of transistor 40, FIG. 3(A).

Referring again to FIG. 4, as the transistor 55 turns alternately off and on, its collector junction B which is connected through a collector resistor 57 to the +V voltage supply corresponding, produces positive pulses having discrete "high" and "low" voltage levels, as illustrated by FIG. 3(B). The magnitude of the "high" voltage levels is equal to the magnitude of the supply voltage of +V volts and the "low" voltage levels are essentially zero volts since when the transistor 55 turns on, the lower terminal of the collector resistor 57 drops to practically ground potential. Thus, as may be seen from FIG. 3(B), the collector terminal B of the transistor 55 produces a train of square pulses having the same frequency as the output pulses from the multivibrator 21, FIG. 3(A).

The collector junction of the transistor 55 is connected to the base of an emitter-follower transistor 60 forming the impedance pad 23. The impedance pad 23 is characterized as having a high input impedance which maintains the normally high AC gain of the transistor 55 and a low output impedance and, also includes an emitter resistor 61 which is coupled parallel across series-connected infrared detectors 12 and 13. The voltage appearing on emitter terminal C to which the upper end of the emitter resistor 61 is connected follows the votage on the collector terminal B of the transistor 55.

The detectors 12 and 13 are series-connected to a common terminal D and are matched to provide equal values of resistance when neither detector receives incident infrared radiation. The detector 13 is a passive detector which serves to compensate for temperature changes in the housing 14, FIG. 1, in which both detectors are mounted. Assuming that the emitter terminal C of the transistor 60 produces discrete pulses having zero and +V volt levels as a result of the transistor 60 being turned off and on, respectively, and assuming that the detector 12 is momentarily passive, the voltage at the terminal D will follow the voltage on the terminal C of the transistor 60 and positive pulses having discrete amplitude levels of zero and +½V volts will therefore appear at the terminal D.

When the forwardmost radiating end portion of the strip 10, FIG. 1, enters the field of detection of the detector 12, the infrared energy emanating from the strip 10 incident to the detector 12 causes a proportionate decrease in the resistance value of the detector 12. The resistance offered by the detector 12 to the +V volt pulses produced at the emitter terminal C decreases proportionately so that the terminal D now receives positive pulses having a minimum amplitude greater than +½V volts and a maximum amplitude of +¾V volts, the latter voltage amplitude representing a condition of minimum resistance offered by the detector 12 in response to maximum intensity incident radiation.

Since the strip 10, FIG. 1, conducts heat to the rollers 11, successive strips supported by the rollers 11 will cause an increase in the temperature of the rollers 11 and a corresponding increase in background radiation. The background radiation incident to the detector 12 will further decrease the resistance of the detector 12 and cause a slightly higher positive voltage at the terminal D, FIG. 4. Thus, those positive pulses which appear at the terminal D coincidentally with a voltage signal produced by the detector 12 in response to incident radiation from an advancing strip, are pulses of composite amplitude formed by the +½V volt clock pulses from the terminal C having superimposed thereon (or added thereto) an analog voltage signal representing the response of the detector 12 to incident radiation. A fraction of a volt of this analog voltage signal may be attributable to background radiation from the rollers 11 and possibly other background radiating sources.

The pulses formed at the terminal D pass through a DC blocking capacitor 66 and appear at the terminal 68 which is clamped at a slightly negative voltage of, for instance, −0.5 volt by a clamping diode 69. The terminal 68 forms the base terminal of an NPN emitter-follower transistor 70 characterized in that the voltage on its emitter terminal 67 follows the voltage on its base terminal 68. The discrete zero voltage pulse increments of the positive pulses received from the terminal D are shifted downward to slightly negative values of −0.5 volt and turn off the transistor 70. When the transistor 70 is turned off, the voltage on the terminal 67 drops to ground potential or zero volts. Conversely, when the transistor 70 is turned on by positive pulse increments of 0.5 volt amplitude, the voltage on the emitter terminal 67 rises sharply to the voltage level of the positive pulse received from the terminal D less the forward voltage drop across the base and emitter terminals of the transistor 70, this voltage drop typically being on the order of 0.5 volt. Thus, the voltage of the emitter terminal 67 follows substantially the voltage of the terminal D. Accordingly, when no infrared radiation is received by the detector 12 from an advancing strip, the emitter terminal 67 produces positive pulses having discrete levels of zero volts and ½V volts less the relatively small forward voltage drop across the emitter-base junction of the transistor 70. Conversely, when the resistance of the detector 12 decreases appreciably, by reason of the detector 12 receiving infrared energy from a radiating strip, the composite pulses which appear at the emitter terminal 67 of the transistor 70 will have positive amplitudes which vary between +½V volts and +¾V volts in direct proportion to the intensity of the infrared radiation incident to the detector 12.

The pulses which appear at the emitter terminal 67 are applied through a base resistor 71 and a lead 72 to an emitter-follower transistor 73 which is essentially identical to the emitter-follower transistor 70 but of opposite conductivity type. Since the transistor 73 is of PNP type with its emitter terminal E connected through emitter resistor 74 to +V volts of battery, its forward base-to-emitter voltage is added to the positive pulses which appear at the emitter terminal E. This voltage typically compensates for the voltage drop produced by the base-to-emitter voltage of the transistor 70. Thus, at the emitter terminal E of the transistor 73 there appears positive pulses having amplitudes practically equal to the amplitudes of the pulses received by the base terminal 68 of the transistor 70 from the terminal D. The transistor 70 presents a high input impedance to the output of the infrared detector 24 and the transistor 73 provides a low output impedance with a gain of unity to the input of the pulse height discriminator 26. The transistors 70 and 73, by virtue of their intercoupling and complementary conductivity types, mutually nullify any DC drift which may be produced through temperature changes in these devices.

Connected to the emitter terminal E is a current-limiting resistor 75 and the anode of a diode 76. The cathode of the diode 76 is connected to the base of a transistor 78 to prevent reverse emitter-to-base current flowing through the transistor 78 when the emitter-follower 73 is turned on. The transistor 78 is operated essentially as a switch. In addition to the resistor 75, the diode 76 and the pulse height discriminator 26 include a potentiometer formed by slide arm 79 and a resistor 80; a pair of identical diodes 81 and 82; a capacitor 84 and a collector resistor 85.

The slide arm 79 is connected to the emitter terminal of the transistor 78 and may be moved along the resistor 80 to tap off a predetermined fraction of the voltage that is applied to the resistor 80 by the battery source +V. The diodes 81 and 82 are connected in series with resistor 80 to provide bias and temperature compensation to the pulse height discriminator 78. The capacitor 84 couples the emitter terminal of the transistor 78 to ground and serves as an AC bypass for the transistor 78.

As discussed hereinabove, a certain level of background infrared radiation is often present even though the strip 10 is not present because the metal rollers 11, FIG. 1, which have previously supported other hot strips of metal may heat up to temperatures of approximately 900° F. Thus, even though a hot strip may not be proximate the detector 12, the background radiation has a sufficiently high intensity to cause a corresponding decrease in the resistance of the detector 12. To illustrate this aspect of the invention, assume that the +V volt supply provides +24 volts to the system. The clock pulses applied to the terminal D from the terminal C will have an amplitude of +12 volts, that is, +½V volts, FIG. 3(D). Further assume that normal background radiation reduces the resistance of the detector 12 an incremental amount causing an additional and practically constant positive voltage bias of, for instance, 0.5 volt to appear at the terminal D. This voltage bias is added at the terminal D to the +12 volt pulses received from the terminal C and the composite +12.5 volt pulses are received at the emitter terminal 67 as +11.5 volt pulses, the one volt decrease in amplitude being due to the clamping action of the diode 69 and the voltage drop across base and emitter junctions of the transistor 70. The +11.5 volt pulses are applied to the base of the transistor 73 and appear as +12 volt pulses at the emitter terminal E, FIG. 3(E).

To discriminate between composite but spurious pulses engendered principally or solely by background radiation and composite, nonspurious pulses engendered not only by background radiation but, more importantly, by radiation from a hot strip passing into and through the field of detection of the detector 12, the discriminator 26 is set to pass only pulses having a height greater than the height of spurious pulses generated solely by extraneous background radiation. The capability of the discriminator 26 to distinguish between spurious and non-spurious pulses is obtained by moving the slide arm 79 on the resistor 80 until a sufficient reverse base-to-emitter bias is applied to the emitter junction of the transistor 78 to prevent the transistor 78 from turning on unless the height of the composite voltage pulses at the emitter terminal E are above the normal maximum height of spurious pulses produced by maximum background radiation.

Thus, continuing with the above example, wherein +12 volt pulses were assumed to be engendered solely by normal levels of background radiation, the composite voltage pulses which appear at the base junction of the transistor 78 will have discrete amplitude levels of zero volts and +12 volts. The slide arm 79 might be set to tap off +13 volts from the resistor 80, this voltage being selected to allow a measure of tolerance for possible increases in composite pulse amplitude due to background radiation. The +13 volt bias applied to the emitter terminal of the transistor 78 will reverse bias the transistor 78 and prevent it from being turned on by +12 volt pulses received from the terminal E.

In order to turn on the transistor 78, the reverse base-to-emitter voltage which must be exceeded to forward bias the transistor 78 into conduction will have to include not only the composite voltage which is produced by the multivibrator 21 and the incident background radiation but, moreover, will have to include an appreciable additional voltage which is only produced when the detector 12 receives radiation from a strip 10 passing into its field of detection. When the forwardmost end of a radiating strip passes into the field of detection of the detector 12, the resistance of the detector 12 will drop appreciably and the voltage at the terminal D will rise appreciably by, for instance, a +6 volt increment, from +12.5 volts to +18.5 volts. The composite +18.5 volt pulses received at the terminal E appear as +17.4 volt pulses to the base of the transistor 78 due to the 0.6 volt drop across the resistor 75 and the diode 76 and will overcome the reverse 13 volt bias needed to turn on the transistor 78. Therefore, the transistor 78 is successively turned on for an interval of time equal to the pulse width of each positive pulse produced when the detector 12 detects and responds to background radiation plus radiation from an advancing radiating strip. Accordingly, the transistor 78 turns on initially when from an advancing radiating strip. Accordingly, the transistor 78 turns on initially when the forward end of the strip 10, FIG. 1, advances into the field of detection of the detector 12 and causes the detector 12 to produce the first pulse of composite amplitude which passes the discriminator 26. Thereafter, the transistor 78 turns on as each pulse of the group of composite pulses passes the discriminator 26. The transistor 78 turns off for a relatively long period of time when the rearward end of the strip advances out of the field of detection of the detector 12, thereby signalling that the strip has advanced beyond the detection field of the detector 12.

Collector terminal F of the transistor 78 is coupled to the voltage supply +V by a collector resistor 85 and is also coupled to a terminal 87 through a DC blocking capacitor 86. During the period when the transistor 78 is turned off, the transistor 78 and the capacitor 86 will appear as open circuits to the collector end of the collector resistor 85, and this end of the resistor 85 will therefore be at +V volts. The negative plate of the capacitor 86 is connected to the terminal 87 which forms a common junction for resistors 88 and 89. The terminal 87 is an input terminal for the voltage amplifier 27 which comprises the resistors 88, 89 and 91 and associated collector resistors 92 and 93, respectively. The resistor 89 forms a base-to-emitter resistor for the transistor 91 which is operated as a Class A amplifier. The resistance value of the resistor 88 is considerably greater than that of the resistor 89 and the values of these resistances are selected so that with the transistor 78 turned off, the voltage which appears across the base-to-emitter resistor 89 will bias the transistor 91 int a quiescent state. In this state, the transistor 91 will be conducting current through its collector resistor 92 and its emitter resistor 93 and the collector terminal G of the transistor 91 and will be at approximately +½V volts.

The collector terminal G of the transistor 91 is connected to the base terminal of an emitter-follower transistor 95 which is normally biased into a quiescent state for Class A operation by the voltage at terminal G. The transistor 95 and its emitter resistor 96 comprise the impedance pad 28 which provides a high input impedance to maintain the AC gain of the transistor 91, a low output impedance and a gain of unity. The amplitude of the voltage on the emitter terminal H of the transistor 95 follows the amplitude of the voltage on the collector terminal G of the transistor 91 and is applied to the positive plate of a DC blocking capacitor 97. The negative plate of the capaciotr 97 has a voltage impressed thereon which is negative with respect to ground potential by a resistor 99 connected to the negative terminal of a battery of —V volts. The resistor 99 is coupled to the emitter junction of a transistor 102 and to one end of a base resistor 103. The resistors 99 and 103 and the transistor 102 comprise the switching device 29. The resistor 99 drives the base of the transistor 102 through its base resistor 103 to the same potential as its emitter junction so as to maintain a zero base-to-emitter voltage across the transistor 102. The transistor 102 is thusly maintained turned off while the transistors 91 and 95 are in quiescence.

The resistor 103 has a resistance value such that the RC time constant provided by it and the capacitor 97 is considerably greater than the widths of the individual nonspurious pulses which are passed by the discriminator 26. By providing an RC time constant to the capacitor 97 and the resistor 103 on the order of say, ten times that of the pulse width of the individual nonspurious pulses, the capacitor 97 will not charge or discharge during a pulse interval but will serve to block passage of DC current. Therefore, the transistor 102 operates as a switch which is normally turned off but which is turned on and off by the leading and trailing edges, respectively, of every positive pulse that passes the discriminator 26. Connected to the collector terminal I of the transistor 102 is a lead 104 which is normally disconnected from the negative terminal of a battery of V volts by the normally turned off transistor 102 but is coupled to the supply of —V volts every time the transistor 102 is turned on. For reasons which will be evident subsequently, the negative pulses which are received at the terminal I rise exponentially toward ground potential.

The operation of the circuit from the pulse discriminator 26 to the switching device 29 is summarized as follows: The transistor 78 will remain reverse biased and turned off until the first composite pulse having an amplitude greater than that of the reverse bias is applied to the base of the transistor 78. This pulse would only be a nonspurious pulse produced by infrared radiation emanating from the forward end of a hot strip advancing into the field of detection of the detector 12. Subsequent nonspurious pulses will be produced as long as the hot strip continues to advance past the detector 12, these subsequent pulses normally forming a group of composite amplitude pulses. When the transistor 78 is forward biased into turning on by the first pulse and all subsequent pulses forming the train of composite pulses, the voltage at its collector terminal F will drop sharply from +V volts, FIG. 3(F), to a lesser positive amplitude of typically +V volts minus +1.0 volt (or to +23 volts) to form a negatively-going leading edge of a positive pulse which passes through the capacitor 86 and drives the voltage on the terminal 87 in a negative direction.

The transistor 91 is rendered less conductive by the negatively-going positive voltage in the terminal 87 and the positive voltage at its collector terminal G increases sharply and causes the transistor 95 to become more conductive so that the emitter terminal H of the transistor 95 follows the higher voltage level of the collector terminal G of the transistor 91, FIG. 3(H). The positive pulse which is produced at the emitter terminal H is passed by the capacitor 97 and appears at the base of the transistor 102 to forward bias that transistor into a state of saturation. With the transistor 102 turned on the lead 104 is connected to the —V volt battery. The transistor 102 remains on for the time duration of each pulse which passes the discriminator 26 so that the lead 104 receives negative voltage pulses which are equal in number to the positive pulses which are passed by the discriminator 26. The lead 104 forms an input lead for the pulse detector 30 and for reasons which will be disclosed subsequently, the negative pulses which are applied to lead 104 drive the pulse detector 30, FIG. 5.

Figure 5:
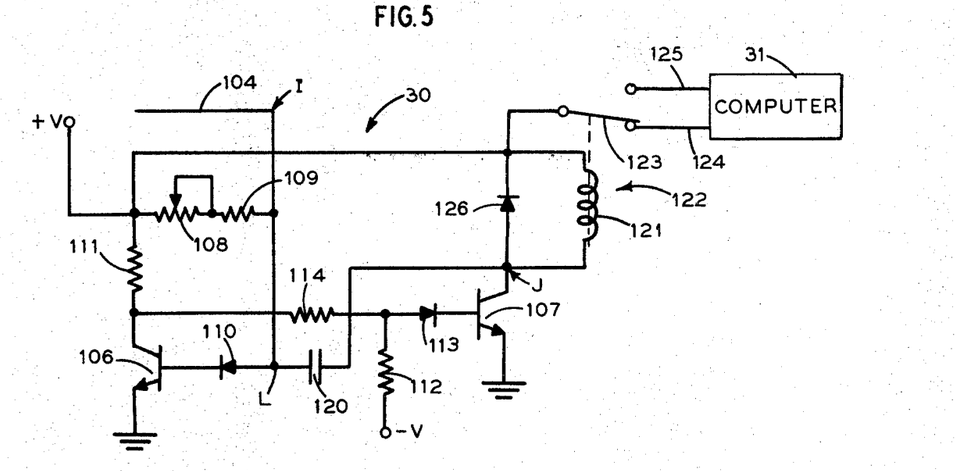
FIG. 5 is a schematic diagram of the remaining part of the circuits and components of the instant infrared detection system.

The pulse detector 30 comprises a pair of transistors 106 and 107 of the same conductivity type and having a grounded emitter configuration. For reasons which will be evident subsequently, the pulse detector 30 operates similar to a monostable switch having an externally adjustable set-reset time interval. During the interval when the lead 104 is open-circuited by the turned off switch 102, FIG. 4, the transistor 106, FIG. 5, will be forward biased into saturation by positive voltage received from the +V volt battery through a potentiometer 108, a fixed resistor 109 and a diode 110 that is forward biased to conduct current into the base of the transistor 106. The transistor 106 may be reversed biased to turn off by negative pulses transmitted by the lead 104 to the anode 110 when the lead is connected to the —V volt battery, FIG. 4, by the transistor 102 turning on. The collector terminal of the transistor 106, FIG. 5, is coupled to the +V volts of battery through a collector resistor 111.

Whereas the transistor 106 is normally forward biased into saturation, the transistor 107 is normally maintained nonconductive by —V volts of battery applied through a resistor 112 to the anode of a diode 113 having its cathode connected to the base terminal of the transistor 107. The negative voltage which is applied to the anode of the diode 113 is sufficient to maintain the transistor 107 turned off. A return-to-ground for the —V volt battery supply of FIG. 5 is provided through resistor 114 and through the normally turned on transistor 106. The normally turned off transistor 107 has its collector terminal J connected to the lead 104 through a capacitor 102 which controls the operation of the detector 30. The collector terminal J of the transistor 107 is also connected to one side of a coil 121 comprising a normally de-energized relay 122, the other side of the coil 121 being connected to the +V volt battery source. The relay 122 controls the operation of a switch 123 which normally connects a lead 124 to the +V volt battery source but which breaks contact with the lead 124 and makes contact with a lead 125 when, and as, long as the relay 121 is energized.

The leads 124 and 125 form individual input leads for a computer 31 which records, and if so desired, provides a print-out as to the duration of +V volts on either the line 124 or 125. A diode 126 is connected in parallel across the terminals of the coil 121 and is utilized to suppress ringing in the coil 121 which might otherwise occur when the transistor 107 is turned off. With the transistor 107 in its normal state of non-conduction, the potential at its collector terminal J will be equal to the potential on the opposite side of the relay 122 and, hence, no current will flow through the coil 121. With the computer 31 maintaining a continuous tabulation of the time intervals during which the battery +V volts is applied to the input lead 124 or 125, a continuous record is provided as to the presence or absence of a radiating strip within the field of detection of the detector 12.

The operation of this section of the aforedescribed circuit is as follows: When the presence of a hot strip is detected by the infrared detector 12 and one or more composite pulses are passed by the discriminator 26, FIGS. 3(F) and 4, the transistor 102 will turn on for the interval of each positive pulse which is applied to its base terminal. Every time the transistor 102 turns on and off, a negative pulse, FIG. 3(I), is produced and transmitted by the lead 104, FIG. 5, to the anode of the diode 110. Such pulses are sufficiently negative to reverse bias the transistor 106 into turning off. Each time the transistor 106 turns off, its collector terminal produces a positive pulse which is applied to the base of the transistor 107 causing the latter transistor to turn on. Each time the transistor 107 turns on, its collector terminal J drops to practically ground potential creating a potential difference across the relay 122 and effectively grounding one plate of the capacitor 120. With the transistor 107 turned on, the plate of the capacitor 120 which is connected to the collector terminal J of this transistor is dropped to practically ground potential and the negative pulse which appears on the lead 104 will drop the potential of the other capacitor plate connected to terminal L sharply to practically —V volts. As a result, the capacitor 120 charges rapidly to practically —V volts and reverse biases the diode 110 and the transistor 106 causing the latter transistor to turn off. The transistor 106 remains turned off until the capacitor 120 discharges through the resistor 109 and the potentiometer 108 to a positive voltage level sufficient to once again forward bias the transistor 106 into turning on. Thus, although the trailing edge of the first positive pulse in the train of pulses, FIG. 3(H) will turn off the transistor 102, FIG. 4, and open circuit the lead 104, once the transistor 102 is turned on by the leading edge of that pulse, the pulse detector 30 comes under the control of the discharging capacitor 120.

The capacitor 120 discharges with an RC time constant primarily determined by the resistance values of the potentiometer 108 and the resistor 109 and the capacitance value of the capacitor. Since the transistor 106 controls the operation of the transistor 107, the RC time constant of pulse detector 30 determines the time during which the transistor 107 remains turned on. It will be apparent that as long as the transistor 107 remains turned on, the relay 122 will be energized and +V volts of battery will be applied through the switch 123 to the input line 125 of the computer 31. Conversely, when the transistor 106 turns on the transistor 107 turns off, the pulse detector 30 will reset and the switch 123 will be restored to contact the input line 124.

The RC time constant of the detector 30 is made variable through an external adjustment of the potentiometer 108. By increasing the resistance of the potentiometer 108, the RC time constant of the pulse detector 30 is increased and by decreasing the resistance of this potentiometer the RC time constant of the pulse detector is correspondingly decreased. Thus, the adjustment which is made to the potentiometer 108 determines when the transistor 106 will reset the pulse detector 30 by turning off the transistor 107.

The RC time constant of the pulse detector 30 is typically adjusted so that the capacitor 120 does not discharge to a level which would cause the diode 110 and the transistor 106 to become forward biased until more than one successive negative pulse is missing from the negative pulse train that is transmitted by the input lead 104 to the detector 30. As discussed briefly hereinabove, the strip 10, FIG. 1, may have puddles of water or slag on the top side of the strip 10 which pass into the field of detection of the detector 12. Such puddles dampen or attenuate the infrared radiation which emanates from the strip 10. Thus, if the puddle is advanced into the field of detection of the infrared detector 12, the intensity of the infrared radiation will be attenuated and the signal voltage which appears across the detector 12 will provide a composite pulse or pulses, depending upon the surface area of the puddle and the frequency of the pulse train, having a voltage amplitude less than the minimum composite amplitude required to pass the pulse discriminator 26. If an RC time constant were not provided to the operation of the detector 30, the premature termination of the negative pulse train applied to the input line 104, FIG. 3(I), would permit the transistor 106 to turn on and reset the pulse detector 30. This switch 123 would then be restored to its initial position, as illustrated in FIG. 5, and an erroneous input signal would be supplied to the computer 31.

Depending upon the observed surface areas of water or slag spots on the surface of the radiating strips which advance toward the infrared detector 12, the potentiometer 108 may be suitably adjusted by an operator so that a predetermined number of successive pulses may be missed from the pulse train produced by the pulse discriminator 26 before the pulse detector 30 resets.

To illustrate this aspect of the invention, assume that an operator visually scans a sample number of radiating strips as the strips leave the rolling mill and before the strips advance into the field of detection of the detector 12 to ascertain the maximum surface area of the pools of slag or water which may appear on the upper surfaces of the strips. From information provided him and possibly from past experience, the operator may conclude that, for a given frequency of the clock pulses produced by the clock 21 and a given velocity of the strips, pools of this maximum surface area would cause no more than every other consecutive pulse to be removed from the pulse train by the discriminating action of the discriminator 26. Such a missing pulse is illustrated by dotted lines in FIG. 3(K) and is designated therein by the numeral 130. The operator may then adjust the potentiometer 108, which may be externally mounted and precalibrated to correspond to a number of possible missing pulse conditions, so that the RC time constant of the detector 30 is long enough to prevent the capacitor 120 from discharging to a voltage exceeding the level required to forward bias the transistor 106 into saturation until after the leading edge of the next successive pulse, designated 131 in FIG. 3(K), is received by the detector 30. The pulse 131 represents the next successive composite pulse passed by the discriminator 26. The pulse 131 will, of course, cause the capacitor 120 to recharge to essentially —V volts to hold the transistor 106 turned off and the transistor 107 turned on and the discharge cycle of the capacitor 120 will begin once again, as illustrated by the solid line in FIG. 3(L). If the second consecutive pulse 131 is also missing, as is normally the case when the rearward end of the strip 10 advances beyond the field of detection of the detector 12, the capacitor 120 will continue to discharge as indicated by the dotted line 132 in FIG. 3(L) to a positive voltage level, of typically +1.2 volts, sufficient to forward bias the transistor 106, FIG. 5, into saturation.

When the transistor 106 turns on, its collector voltage drops rapidly toward ground potential and the transistor 107 becomes reversed biased by negative voltage from the —V volt battery which is applied through the resistor 112 to the anode of the diode 113. Thus, the transistor 107 turns off, the voltage at its collector terminal J rises sharply to substantially +V volts and the switch 123 will be restored to its initial contact with the input line 124. The computer 31 will record the restored connection of the switch 123 to the input lead 125. The RC time constant of the pulse detector will time delay the resetting of the pulse detector 30 when an "end of strip" condition is detected by the infrared detector 12. However, this delay is normally constant and may be ignored as being insignificant when compared to the inherent delay of the relay 122. If so desired, the computer 31 may be programmed to compensate for this delay as will be apparent to those working in the art.

Obviously, if the condition of the advancing strips is such that it might be expected that two successive pulses will be missed from the pulse train, the time constant of the detector 30 could be further increased by additionally increasing the resistance of the potentiometer 108 so as to prevent the resetting of the detector 30 until this number of consecutive pulses are absent from the pulse train. Although an increase in the resistance value of the potentiometer 108 will cause a decrease in current supplied to the diode 110 and the transistor 106, the amount of current available from the battery +V to drive the diode 110 and the transistor 106 into saturation far exceeds any reduction in current caused by adjustment of the potentiometer.

As mentioned briefly hereinabove, the frame 15, FIG. 1, may be reciprocated at a constant velocity transverse to the direction of advancement of the strip 10 and successive strips. The detector 12 may then detect the initial presence of a radiating strip by receiving radiation from one of the two lengthwise edges of the strip, depending upon the initial position of the frame. The continued presence of the radiating strip in the field of detection of the strip-scanning detector 12 is thereafter monitored by the aforedescribed detection system.

While there has been described what is at present considered to be a preferred embodiment of this invention, it will be obvious to those skilled in the art that various changes and modifications may be made in the instrument without departing from the invention, and it is, therefore, intended to cover all such changes and modifications as fall within the true spirit and scope of the invention. For example, a solid state bipolar switch might be substituted for the relay 122 and the switch 123 to effect the selective energization of the input leads 124 and 125 of the computer 31. Or, if desired, the collector terminal J of the transistor 107 could be monitored by the computer 31 since the voltage at the terminal J goes "low" and remains low for the time interval when a strip is detected by the detector 12.

What is claimed is:

1. A system for detecting the presence of an article moving in a path and having an infrared radiating surface which may include discrete surface areas that attenuate the infrared energy emanating from such discrete areas, the system comprising, an infrared energy detector positioned to receive infrared radiation from at least a portion of the moving article and producing a signal upon receiving incident radiation therefrom, the amplitude of the signal varying proportionately to the intensity of radiation incident to said detector, means for producing a series of pulses of substantially constant amplitude, the pulse producing means being coupled to said detector so as to apply the pulses to said detector, whereby said detector produces at least one pulse of composite amplitude as a result of receiving radiation from the article, said composite amplitude being at least greater than the sum of the amplitude of each constant amplitude pulse and any additional pulse amplitude attributable to radiating sources other than the article, a pulse amplitude discriminator coupled to said detector to receive pulses therefrom, said discriminator passing only those pulses of said composite amplitude, a monostable device coupled to said discriminating means and switching from a stable state to an unstable state in response to the first pulse passed by said discriminator, means coupled to said monostable device for time delaying the switching of said monostable device from the unstable state to the stable state until more than a predetermined number of successive pulses fail to pass asid discriminator, said predetermined number of pulses representing the maximum size of a discrete article surface area that may attenuate infrared radiation as the article moves relative to the detector.

2. A system for detecting the presence of an article that radiates infrared energy comprising, at least one infrared detector for detecting infrared radiation emanating from at least one portion of the article when that portion of the article enters the field of detection of said detector, pulse generating means coupled to said infrared detector for generating at least one group of sequential pulses having substantially constant amplitude and frequency, said infrared detector increasing the amplitude of at least one of the constant amplitude pulses an incremental amount corresponding to the level of all infrared radiation incident to the detector and thereby forming at least one pulse of composite amplitude, pulse amplitude discriminating means coupled to said detector so as to receive pulses therefrom and passing pulses of composite amplitude greater than said constant amplitude and in addition, that amplitude increment of said pulse of composite amplitude which is attributable to infrared-radiating sources other than the infrared-radiating article, and bistate switching means coupled to said pulse discriminating means for switching from one state to another state to produce an output signal representing the detected presence of the article in response to the first pulse of the group of pulses passed by said pulse discriminating means.

3. The system as claimed in claim 2, wherein said bistate switching means is monostable and switches from a stable state to an unstable state to produce the output signal.

4. The system as claimed in claim 3, wherein said bistate switching means includes apparatus for introducing a variable time delay to the switching from the unstable state to the stable state to compensate for the failure of said discriminating means to pass at least one pulse of the pulse group that is successive to the first composite pulse.

5. The system as claimed in claim 4, wherein the time delay apparatus includes a variable resistor and a capacitor coupled together to provide a variable time constant to the switching of said bistate switching means from the unstable state to the stable state.

6. The system as claimed in claim 2 which further comprises, a housing mounting said one infrared detector, a passive detector mounted in said housing adjacent said one detector, said passive detector being impedance-matched to said one detector when both detectors receive an equal amount of infrared radiation and being serially connected to said one detector so as to provide temperature compensation thereto.

7. The combination of the system as claimed in claim 2 and means for monitoring the output of said bistate switching means and responsive to an output signal therefrom to provide an indication that the radiating article is within the field of detection of said detector.

References Cited

UNITED STATES PATENTS

| 3,319,071 | 5/1967  | Werth et al.            |
|-----------|---------|-------------------------|
| 3,372,278 | 3/1968  | Aemmer.                 |
| 3,201,591 | 8/1965  | Froelich ______ 250—83.3 |
| 3,356,212 | 12/1967 | Landin ______ 250—83.3 X |
| 3,096,650 | 7/1963  | Lowenstein et al.       |

WILLIAM F. LINDQUIST, Primary Examiner

M. J. FROME, Assistant Examiner

U.S. Cl. X.R.

250—43.5